Sept. 14, 1954     C. J. WERNER     2,689,146
LOCKING WASHER
Filed April 29, 1950     2 Sheets-Sheet 1
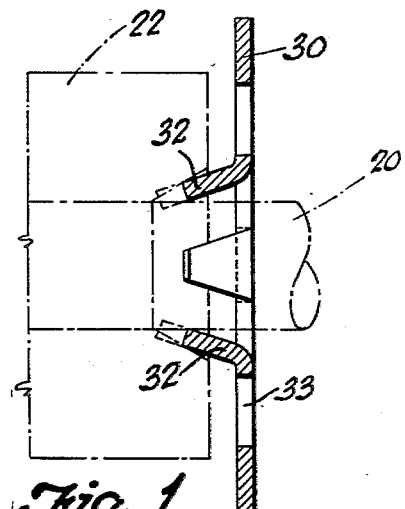
Fig. 1.
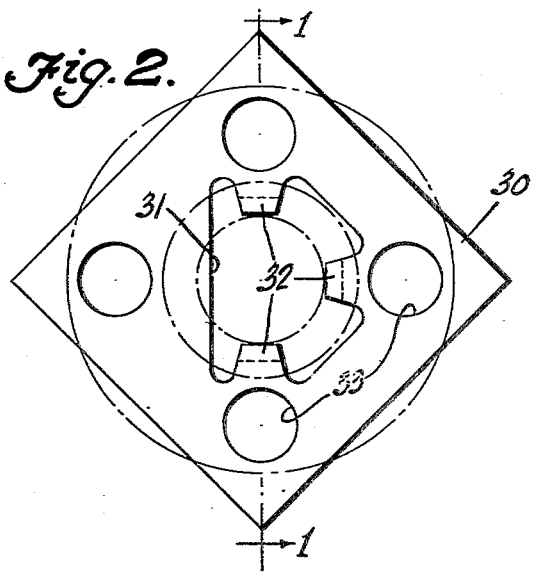
Fig. 2.
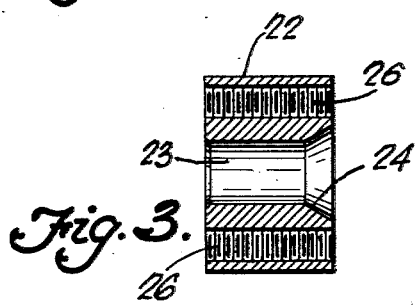
Fig. 3.
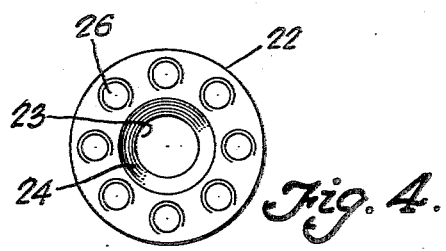
Fig. 4.
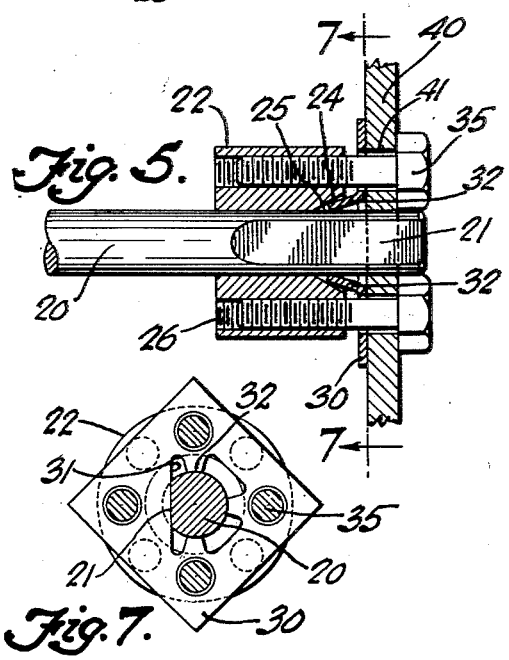
Fig. 5.
Fig. 7.
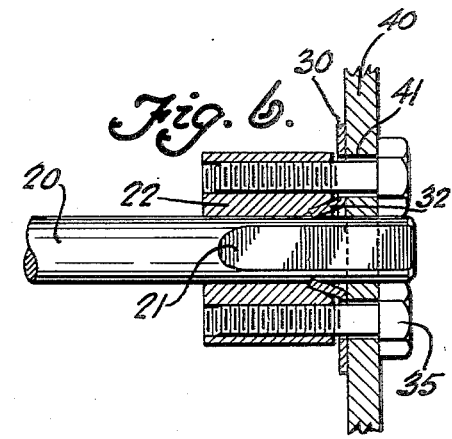
Fig. 6.
INVENTOR
CALVIN J. WERNER
BY
ATTORNEYS

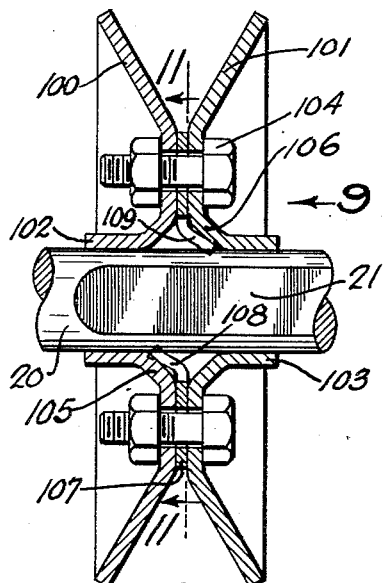
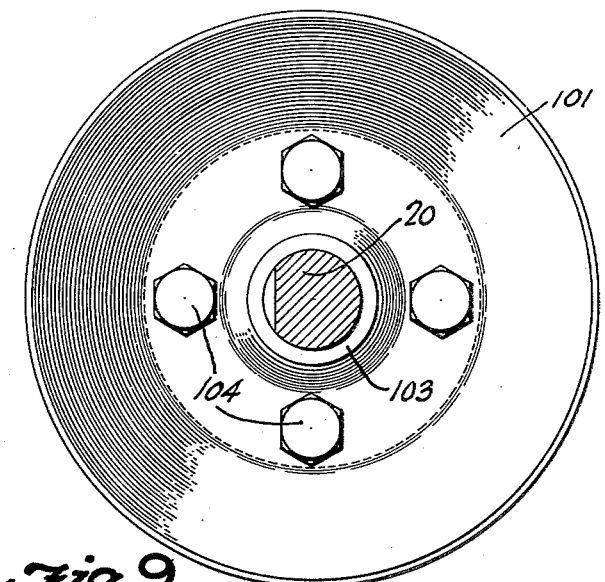
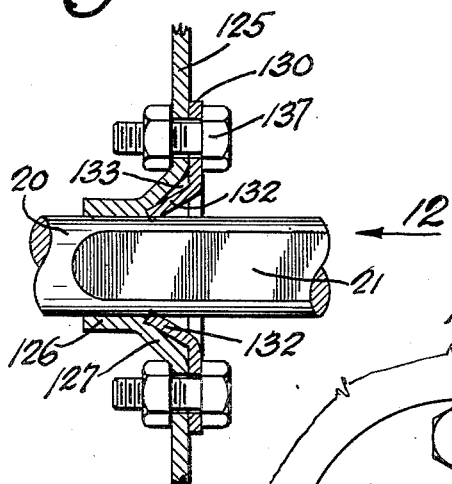
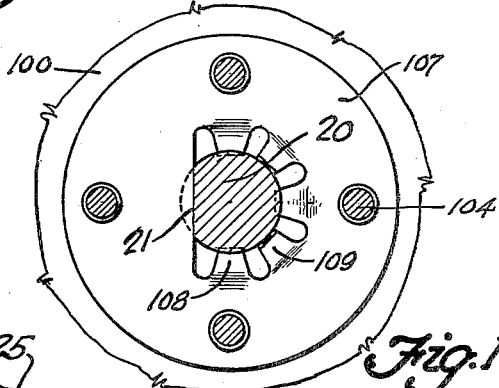
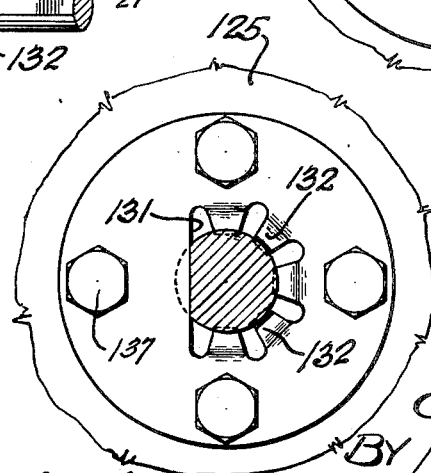

Patented Sept. 14, 1954

2,689,146

UNITED STATES PATENT OFFICE 2,689,146

LOCKING WASHER

Calvin J. Werner, Dayton, Ohio, assignor to General Motors Corporation, Detroit, Mich., a corporation of Delaware Application April 29, 1950, Serial No. 158,959

7 Claims. (Cl. 287—52)

This invention relates to an improved mechanism for anchoring a member to a shaft.

It is among the objects of the present invention to provide a mechanism operative immovably to secure a member to a shaft without requiring the shaft to be specially machined to secure the member in any predetermined location longitudinally on the shaft.

A further object of the present invention is to provide a mechanism which is operative immovably to anchor various kinds of power transmitting devices in any number of different selected positions longitudinally of a shaft, thereby permitting a standard power device, as for instance an electric motor, to be used for various installations without requiring its shaft to be especially machined for each separate installation.

Further objects and advantages of the present invention will be apparent from the following description, reference being had to the accompanying drawings wherein a preferred embodiment of the present invention is clearly shown.

In the drawings:

Fig. 1 is a sectional view taken substantially along the line and in the direction of the arrows 1—1 of Fig. 1.

Fig. 2 is a front view of the wedging disc or washer, the dot and dash lines in this figure as well as in Fig. 1, indicating the cooperating hub member.

Fig. 3 is a sectional view of the hub.

Fig. 4 is an end view of the hub.

Fig. 5 is a sectional view of all of the elements of the mechanism shown in the relative positions preparatory to final anchoring operation.

Fig. 6 is a view similar to Fig. 5, the elements, however, being shown in completely assembled relative positions.

Fig. 7 is a sectional view taken substantially along the line and in the direction of the arrows 7—7 of Fig. 5.

Fig. 8 is a sectional view showing the present invention used to secure a pulley to a shaft.

Fig. 9 is a view of the installation shown in Fig. 8 and taken in the direction of the arrow 9.

Fig. 10 is a fragmentary view of a modified form of the structure shown in Fig. 8.

Fig. 11 is a partially disassembled view taken substantially along the line and in the direction of the arrows 11—11 in Fig. 8.

Fig. 12 is a view of the device of Fig. 10, taken in the direction of the arrow 12.

An electric motor of certain length drive shaft position extending from its housing may be used in many types of installations. Each installation, however, may require a different element to be anchored to the motor drive shaft and in a different location longitudinally of the drive shaft extending from the motor housing. Several methods for securing the element to the shaft in the desired longitudinal location are used. Radially arranged pins or screws may extend through the element into the shaft, or perhaps a shoulder is turned on the shaft to be engaged by the element for locating purposes and then the shaft is machined to receive a clamping or anchoring screw, nut or other securing means. In each instance it is necessary especially to machine the motor drive shaft for adapting it to the selected means of locating and securing the element upon the shaft. Thus each standard motor must have a specially machined drive shaft assembled therein in order to adapt the standard motor to the particular installation.

As stated, the present invention has for its object the provision of an improved attachment device which is adapted to anchor substantially any kind of element or mechanism in any selected position on the shaft of a standard electric motor without requiring said standard shaft to be especially machined for the particular installation. This then permits a standard electric motor to be selected for use in many types of installation without special machining of parts and assembly thereof.

The device of the present invention as illustrated by the accompanying drawings is applicable to a cylindrical shaft 20, preferably provided with a flattened area 21 for a portion or all of its exposed length. One type of installation may have a hub 22 which has a central bore 23 to fit over the shaft 20, the one end of the bore 23 being chamfered or tapered as at 24 so that a wedge shaped space 25 is provided between the surfaces of the shaft and the tapered end of the bore when the hub is placed on the shaft. Arranged in a circular row about the central bore 23 of the hub are a plurality of threaded holes 26.

After the hub 22 is placed upon the shaft 20 with the tapered end 24 of the bore 23 toward the end of the shaft, the washer or disc 30 is placed upon said shaft. The disc 30 is made of a metal substantially harder than the shaft or hub. This disc or washer 30 has a substantially D-shaped central opening through which the shaft extends. The flat side 31 of the D-shaped opening engages the flattened side or surface 21 of the shaft, thereby rendering the disc or washer non-rotatable on the shaft. Edge portions of the disc not including the flat portion 31, which define the central opening, are bent angularly to the flat body portion of the washer 30, said bent portions forming spaced prongs 32 extending from the washer. These prongs extend into the wedge-shaped space 25 when said washer is placed on the shaft, the angle at which said prongs are bent causing the respective end edges of each prong to engage the surface of the shaft and the tapered surface 24 of the hub, as shown in Figs. 1 and 5. Fig. 1 shows the shaft and hub in dot and dash lines. A plurality of holes 33 are provided in washer 30, said holes aligning with threaded holes 26 in the hub.

After the washer 30 is placed upon the shaft 20, the element to be immovably mounted upon the shaft is placed thereon. In this case this element is shown as a plate 40, centrally apertured to fit upon the shaft and having holes 41 spaced and relatively located so as to align with the holes 33 in the washer. Now bolts or studs 35 are inserted through the aligned holes 41 and 33 of the plate and washer respectively and threadedly are received by the holes 26 in the hub, or they may extend through unthreaded holes in the hub and be provided with nuts engaging the outer end of the hub.

As said studs are screwed into the hub 22, which in any suitable manner is held in the desired position on shaft 20 during assembly, plate 40 is drawn toward said hub and in so doing presses the washer 30, interposed between the hub and plate, toward and against said hub. As the washer is pressed against the hub the adjacent surfaces of the hub and shaft are engaged by said prongs, due to the fact that said surfaces present a wedge shaped space 25 into which the prongs 32 are being forced. This securely anchors the hub 22 to the shaft 20 so that relative movement of the hub and shaft, and particularly longitudinally of said shaft is prevented. The engagement of the flat edge 31 of the washer with the flat side 21 of the shaft presents relative rotation and takes the torque strains off the joint provided by the prongs biting into adjacent hub and shaft surfaces.

Figs. 9 to 12 inclusive illustrate modified forms of installations utilizing the present invention. In Fig. 8 a pulley is attached to shaft 20, said pulley consisting of two identical, pressed sheet metal members 100 and 101. Each member has a cylindrical hub portion 102 and 103 respectively, which slidably fit about shaft 20. The members are placed upon the shaft so that the flat body portions thereof are contiguous, the hub portions extending outwardly and angular outer portions of the members cooperating to form a V-shaped pulley. The flat body portions are perforated to receive clamping bolts 104. The joining area between the hub and wall portion of each member is angular as at 105 and 106 respectively, thereby forming a wedge shaped space between each member and the shaft. A locking washer 107 is placed between the members 100 and 101 as they are assembled on the shaft. This washer 107, like washer 30, previously described, is in the form of a plate or disc having a central opening fitting over shaft 20. A flat edge in the opening engages the flat side 21 on the shaft, the other edge portion of the opening having spaced bent portions providing tangs. Alternate tangs 108 are bent to extend from one side of the lock washer 107 into the wedge shaped space between the shaft 20 and member 100, while the other alternate tangs 109 extend from the opposite side of the lock washer 107 into the wedge shaped space between shaft 20 and the member 101. When the bolts 104 are actuated to draw members 100 and 101 together with the lock washer 107 therebetween, the tangs 108 and 109 are forced into the respective wedge shaped spaces causing the outer end edges of said tangs to gouge or bite into the engaged surfaces of the shaft and members and be embedded therein to secure said members to the shaft.

Fig. 10 shows another modified form of installation. Here a sheet metal member 125 is attached to shaft 20, this member having a hub portion 126 and an angular wall 127 like those provided on members 100 and 101 of Fig. 8. The body of member 125 is perforated to match the perforations in the locking washer 130 so that bolts 137 may be inserted therethrough. Lock washer 130 in this installation is similar to the lock washer 30 previously described. It has an opening to fit over the shaft, a flat side 131 in the opening engaging the flat side 21 on shaft 20. The plurality of tangs 132 extending from the lock washer extend into the wedge-shaped space 133; and, when bolts 137 are operated to clamp the lock washer 130 against the member 125, said tangs will bite into and become embedded in the engaged surfaces of the shaft 20 and the member 125 securing them together.

From the foregoing it may be seen that the present invention makes it possible to use a standard motor in varied installations without special machining of parts of the motor which would be necessary if ordinary and well known methods and means were used to attach other parts of the installation to the drive shaft of the motor.

The device of the present invention requires a minimum number of parts which coact, during the assembling of a part on the motor shaft, to immovably anchor the post to the shaft, the assembling operation requiring only a simple wrench to operate the clamping and anchoring studs or screws.

While the embodiment of the present invention as herein disclosed, constitutes a preferred form, it is to be understood that other forms might be adopted.

What is claimed is as follows.

1. A device for securing a power transmitting mechanism to a shaft, said mechanism consisting of two members, each having a hub portion provided with an opening to fit about the shaft, the adjacent ends of both openings being tapered, the device comprising a washer interposed between said two members and having integral tangs extending therefrom into each tapered opening, the end edges of said tangs being embedded in the respective surfaces of the shaft and tapered openings to secure the members to the shaft; and clamping means engaging both members and being operative to move both members into tight clamping engagement with the washer therebetween, movement of said members to clamp the washer causing the tangs of the washer to bite into the shaft and tapered opening surfaces respectively.

2. Attachment mechanism for securing a plate to a shaft, said mechanism comprising, a shaft, a hub having a plurality of holes one of which is a central bore to receive the shaft and which is tapered at one end thereof; a washer of metal harder than the shaft and hub, said washer having holes coinciding with the holes and the central bore in the hub, said washer having portions of the edges of the central hole in the washer bent over to provide a plurality of tangs positioned in the tapered end of the hub bore; a plate having a central opening fitting over the shaft and holes coinciding with the holes in the washer and hub; and bolts extending through the holes in the plate, washer and hub providing tightening means to draw the plate toward the hub with the washer therebetween whereby to cause the tangs of the washer to bite into the surfaces of the hub and shaft engaged thereby to secure the two together against relative movement.

3. A device in accordance with claim 2 in which, however, the shaft is provided with a flattened, longitudinal area and the central opening in the washer is substantially D shaped to fit over the shaft, the curved edges of the central hole in the washer providing the angularly extending tangs adapted to bite into engaged surfaces of the hub and shaft.

4. In combination, a drive shaft, a driven member having a smooth walled opening receiving said shaft slidably, said opening having a tapered wall providing a wedge shaped, annular space between said member and said shaft; an apertured washer positioned adjacent said member, fitting upon said shaft and having a plurality of prongs extending from the washer into the said wedge shaped annular space, the ends of said prongs being blunt to provide opposite edges engaging the shaft and the tapered wall of the driven member and preventing the prongs from completely entering the said space; and means operatively engaged with said washer to move the washer toward the driven member whereby to force the prongs of the washer into embedding engagement in the surfaces of both the shaft and said wall whereby to secure the shaft and driven member together against relative movements.

5. In combination, a driving element, a driven element attached to said driving element, said driven element being apertured, axially slidably receiving said driving element and being recessed to form with said driving element an annular tapering space therebetween, an apertured member fitting over the driving element and provided with a plurality of inwardly projecting angular blunt end prongs extending therefrom into said tapering space, the blunt ends of said prongs contacting both the driving element and the driven element, and clamping means operatively connected with the driven element and said member to urge the said member toward the driven means to press said prongs into biting engagement with both the driving element and the driven element, whereby to immovably secure them together.

6. A device in accordance with claim 4 that includes the structure wherein the prongs on the washer extend from the periphery of the aperture and angularly inwardly toward the center of the aperture.

7. A device in accordance with claim 4 wherein the said shaft has a flat side along a portion of the length thereof, and wherein the aperture in the washer is substantially "D" shaped with the flat side of the aperture engaging the flat side of the shaft when the washer is disposed upon the shaft, and the prongs of the washer extend from the periphery of the circular portion of the aperture angularly inwardly toward the center of the aperture.

References Cited in the file of this patent

UNITED STATES PATENTS

| Number | Name | Date |
| --- | --- | --- |
| 800,802 | Franquist | Oct. 3, 1905 |
| 883,505 | Wenrich | Mar. 31, 1908 |
| 1,028,290 | Sessions | June 4, 1912 |
| 1,085,821 | Rettstatt | Feb. 3, 1914 |
| 1,192,404 | Ewart | July 25, 1916 |
| 1,561,880 | Morrison et al. | Nov. 17, 1925 |
| 1,873,621 | Moore | Aug. 23, 1932 |
| 2,089,410 | Olson | Aug. 10, 1937 |
| 2,257,959 | Hoppenstand | Oct. 7, 1941 |